United States Patent
Kato (10) Patent No.: US 7,909,952 B2
(45) Date of Patent: Mar. 22, 2011

(54) METHOD FOR ASSEMBLING MAIN WING MADE OF ALUMINUM ALLOY

(75) Inventor: Hiroshi Kato, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 601 days.

(21) Appl. No.: 12/000,408

(22) Filed: Dec. 12, 2007

(65) Prior Publication Data

US 2008/0245468 A1    Oct. 9, 2008

(30) Foreign Application Priority Data

Dec. 13, 2006  (JP) ................. P2006-336216

(51) Int. Cl.
B32B 7/04 (2006.01)
B32B 37/00 (2006.01)
B29C 65/00 (2006.01)
B64C 1/00 (2006.01)
B64C 3/00 (2006.01)
B64C 5/00 (2006.01)

(52) U.S. Cl. ....... 156/92; 156/285; 156/300; 244/123.7; 244/123.8

(58) Field of Classification Search ............ 156/91, 156/92, 196, 212, 213, 292, 285, 286, 297, 156/299, 300, 311, 314, 316, 325, 330, 381, 156/382, 391, 443, 475, 476, 481, 499, 538, 539, 556, 559, 578, 580; 244/123.1, 123.7, 123.8, 123.9

See application file for complete search history.

(56) References Cited

U.S. PATENT DOCUMENTS

| | | | | |
|---|---|---|---|---|
| 4,595,444 A | * | 6/1986 | Legge et al. | 156/285 |
| 4,783,228 A | * | 11/1988 | Aker et al. | 156/64 |
| 5,528,828 A | * | 6/1996 | Leahy et al. | 29/889.6 |
| 6,116,539 A | | 9/2000 | Williams et al. | |
| 2002/0053175 A1 | * | 5/2002 | McKague et al. | 52/309.13 |
| 2004/0093731 A1 | * | 5/2004 | Sarh | 29/897.3 |
| 2004/0119222 A1 | * | 6/2004 | Kato | 269/296 |
| 2005/0247818 A1 | * | 11/2005 | Prichard et al. | 244/1 R |
| 2007/0107189 A1 | * | 5/2007 | Prichard et al. | 29/448 |

FOREIGN PATENT DOCUMENTS

JP    2000-198496 A    7/2000

* cited by examiner

*Primary Examiner* — Philip C Tucker
*Assistant Examiner* — Brian R Slawski
(74) *Attorney, Agent, or Firm* — Birch, Stewart, Kolasch & Birch, LLP

(57) ABSTRACT

A method for assembling a main wing having an upper skin and plurality of spars is disclosed. The front spar and rear spar are fastened to a back surface of the upper skin using an adhesive agent without using rivets, whereby the front surface of the upper skin becomes smooth.

4 Claims, 10 Drawing Sheets

METHOD FOR ASSEMBLING MAIN WING MADE OF ALUMINUM ALLOY

FIELD OF THE INVENTION

The present invention relates to an improved method for assembling a main wing made of an aluminum alloy.

BACKGROUND OF THE INVENTION

A main wing made of aluminum alloys used in aircraft is composed of separately manufactured outer plates, beams, and ribs, and the wing is assembled by fastening these parts with rivets. However, when the abovementioned parts are fastened with rivets, there is an unavoidable increase in the number of assembly processes due to rivet hole forming work and rivet driving work, a concentration of stress in the rivet holes, and a drop in the smoothness of the wing surface at the rivet head parts.

Accordingly, a method in which the main wing is joined by welding has been proposed in U.S. Pat. No. 6,116,539 as a method for solving such problems. This main wing is shown in FIG. 12 hereof.

Figure 12:
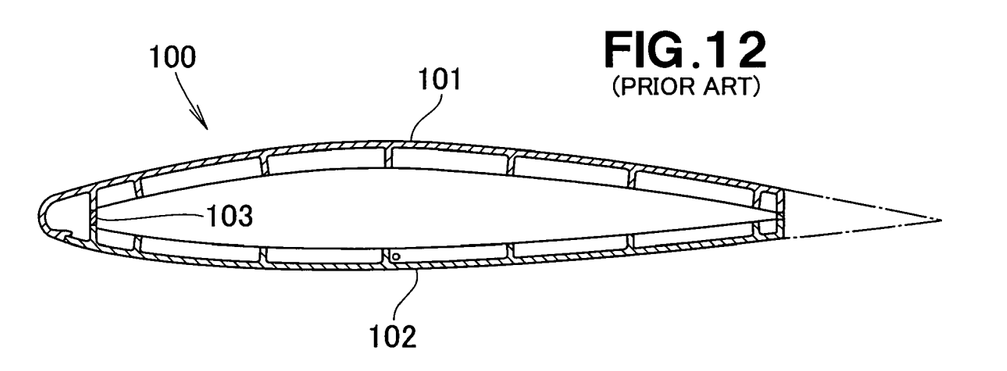
FIG. 12 is a schematic view showing a conventional aircraft main wing.

Referring to FIG. 12, the aircraft forward wing structure 100 comprises a wing upper surface box structure 101, a wing lower surface box structure 102, and an intermediate spar 103. The wing upper surface box structure 101, wing lower surface box structure 102, and an intermediate spar 103 are respectively joined by laser welding. As a result, the problem of rivet fastening is solved.

Since the abovementioned laser welding is performed on materials made of an aluminum alloy, welding defects such as solidification cracks, blow holes, and the like are generated in the welded parts, and there is a danger that the mechanical strength in the welded parts will drop.

SUMMARY OF THE INVENTION

It is an object of the present invention to provide a method for assembling a main wing made of an aluminum alloy which can ameliorate the increase in the number of assembly processes, concentration of stress, and drop in the smoothness of the wing surface caused by rivet-fastening, as well as the drop in mechanical strength caused by the generation of defects due to welding.

According to the present invention, there is provided a method for assembling a main wing made of an aluminum allow, which comprises the steps of: positioning an upper skin of a wing skin on a bonding cart on the basis of a first reference part disposed on a forming surface of the bonding cart; positioning and fastening a plurality of spars via an adhesive agent on the upper skin on the basis of a second reference part disposed on the bonding cart; covering at least bonding sites of the upper skin and each of the spars with a backing film; and adhesively joining the upper skin and the spars by pressurizing and heating the bonding sites inside an autoclave, removing the air from the inside of the backing film, and curing the adhesive agent.

Since the upper skin and the plurality of spars are thus joined by an adhesive agent, rivet-fastening becomes unnecessary, and the number of assembly processes can be reduced. Furthermore, the concentration of stress does not occur, the wing surface smoothness is improved so that the resistance of the aircraft body is reduced, and the air power performance is improved.

Moreover, welding defects such as solidification cracks, blow holes, and the like occurring in conventional welding are not generated, and the mechanical strength can be improved, thus making it possible to manufacture a highly reliable main wing made of an aluminum alloy.

Preferably, the method further comprises the steps of separating an upper skin assembly, which is composed of the bonded upper skin and the plurality of spars, from the bonding cart after the adhesive agent has cured; positioning the upper skin assembly on an assembly jig on the basis of a third reference part disposed on the assembly jig; rivet-fastening the upper skin assembly and a plurality of ribs after the ribs are disposed in predetermined positions on the upper skin assembly; and rivet-fastening the upper skin assembly and lower skin after the lower skin of the wing skin has been disposed in a predetermined position with respect to the upper skin assembly to which the ribs have been riveted.

Since the lower skin and the plurality of ribs are fastened by rivets to the upper skin assembly, the upper skin assembly and lower skin are strongly fastened, and the rigidity of the main wing can be improved.

Desirably, the method further comprises holding the plurality of spars by fastening a beam pressing jig to the upper parts of the plurality of spars when the spars are positioned on and fastened to the upper skin. Accordingly, since the plurality of spars is held by this beam pressing jig, the bonding sites between the upper skin and plurality of spars are pressurized and heated, and deformation of the plurality of spars is suppressed until the adhesive agent is cured.

BRIEF DESCRIPTION OF THE DRAWINGS

Certain preferred embodiments of the present invention will be described in detail below, by way of example only, with reference to the accompanying drawings, in which.

DESCRIPTION OF THE PREFERRED EMBODIMENTS

Figure 1:
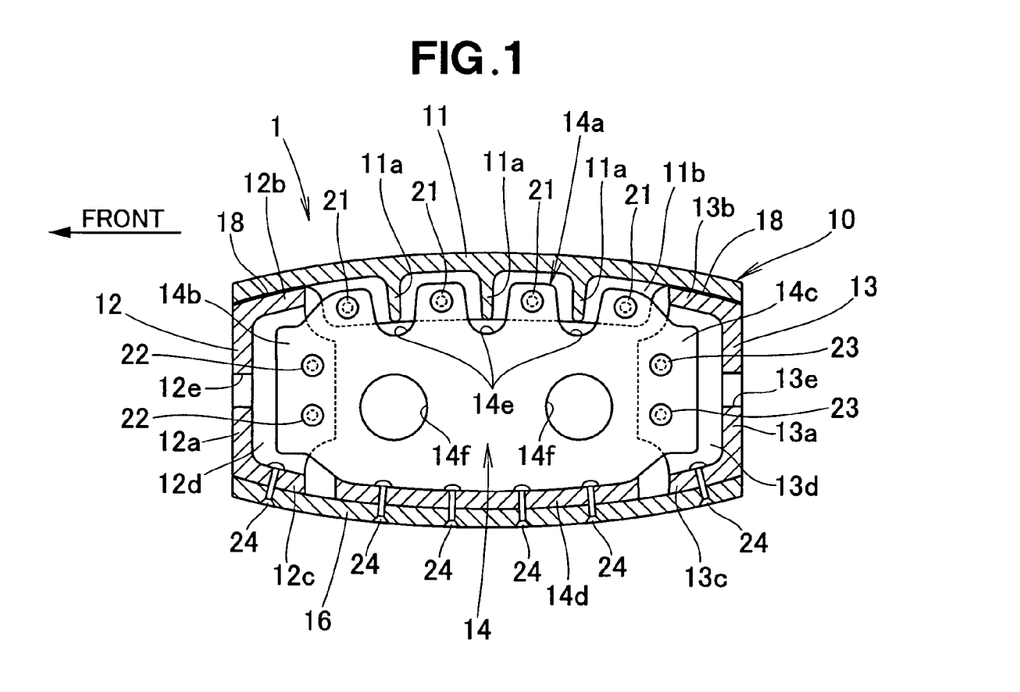
FIG. 1 is a sectional view showing an aircraft main wing assembled by a method according to the present embodiment.

Reference is first made to FIG. 1 showing in cross-section an aircraft main wing structure 10 assembled in accordance with the present invention. Arrowed FRONT indicates a front direction of the aircraft.

The main wing structure 1 shown in FIG. 1 comprises an upper skin (wing upper surface structure) 11, a lower skin (wing lower surface structure) 16, and a front spar 12 and rear spar 13 which are interposed between the upper skin 11 and lower skin 16. The front spar 12 and rear spar 13 are joined to the abovementioned upper skin 11 by bonding, and function as intermediate beams in the span direction of the wing (front-back direction of the plane of the page).

A plurality of ribs 14 (only one is shown in the drawings) is fastened by rivets to the abovementioned upper skin 11, front spar 12 and rear spar 13.

The abovementioned lower skin 16 is fastened by rivets to the abovementioned front spar 12, rear spar 13 and of ribs 14.

In the drawings, the portions indicated by thick lines are bonding sites 18, 18 where the front spar 12 and rear spar 13 are bonded to the upper skin 11.

For aerodynamic reasons, a highly precise smoothness is required in the upper surface of the upper skin 11. Accordingly, in the present invention, the front spar 12 and rear spar 13 are bonded to the upper skin 11 instead of being fastened by rivets, so that a highly precise smoothness is obtained.

A plurality of stringers 11a that extend in the wing span direction, as well as a plurality of attachment parts 11b that are lined up at intervals in the wing span direction so as to connect these stringers 11a, are integrally formed on the lower surface of the upper skin 11.

The front spar 12 is a member that is substantially C-shaped in cross section, and comprises a web 12a, flanges 12b and 12c that are integrally disposed on the upper and lower ends of this web 12a, and a plurality of attachment parts 12d which are integrally formed so that these parts are lined up at intervals in the wing span direction in order to connect the web 12a and flanges 12b, 12c. Furthermore, 12e is an interior hole used to lighten the weight, which is formed in the web 12a.

The rear spar 13 has the same shape as the front spar 12, and comprises a web 13a, flanges 13b and 13c that are integrally disposed on the upper and lower ends of this web 13a, and a plurality of attachment parts 13d which are integrally formed so that these parts are lined up at intervals in the wing span direction in order to connect the web 13a and flanges 13b and 13c. Furthermore, an interior hole 13e is formed in the web 13a in order to lighten the weight.

Each of the abovementioned plurality of ribs 14 comprises an upper attachment part 14a used for attachment to the attachment parts 11b of the upper skin 11 by a plurality of rivets 21, a front attachment part 14b which is used for attachment to the attachment parts 12d of the front spar 12 by a plurality of rivets 22, a rear attachment part 14c which is used for attachment to the attachment parts 13d of the rear spar 13 by a plurality of rivets 23, and a lower flange 14d which is used for attachment to the lower skin 16 by a plurality of rivets 24. Furthermore, 14e indicates cut-outs which are formed in order to avoid the stringers 11a of the upper skin 11, and 14f indicates interior holes used to lighten the weight.

The lower skin 16 is fastened by rivets 24 to the flange 12c of the front spar 12, the flange 13c of the rear spar 13, and the lower flanges 14d of the ribs 14.

The assembly method for the main wing structure 1 described above will be described with reference to FIGS. 2 through 11.

Figure 2A:
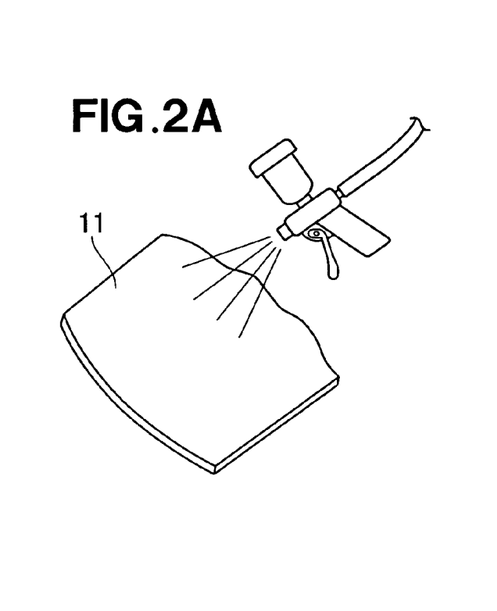
FIGS. 2A and 2B are schematic views showing the adhesive pretreatment of an upper skin and a rear spar.
Figure 2B:
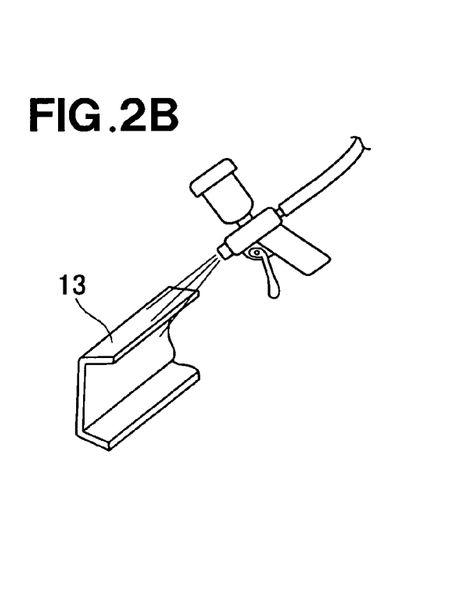

FIGS. 2A and 2B show the bonding pretreatment of the upper skin 11 and rear spar 13.

In FIGS. 2A and 2B, as a pretreatment used to change the respective surfaces of the aluminum alloy upper skin 11, front spar 12 (FIG. 1), and rear spar 13 into a state that is suited for boning, fine indentations and projections are formed in the surfaces by, for example, a sulfuric acid-chromic acid etching treatment or anodic oxidation treatment (a so-called anodizing treatment, such treatments include a chromic acid anodic oxidation treatment and a phosphoric acid anodic oxidation treatment).

Following this pretreatment, masking is applied to the outer surface of the upper skin 11, and the lower surface of the upper skin 11 and the entire front spar 12 and rear spar 13 are spray-coated with an adhesive primer.

The adhesive primer promotes the adhesion of the adhesive agent to the surface provided with indentations and projections, and is used to heighten the adhesive strength. For example, an epoxy primer is suitable. Furthermore, in the main wing structure, besides an adhesive primer, an anti-rust primer and a fuel tank primer (used to prevent corrosion by the fuel) are used.

Figure 3A:
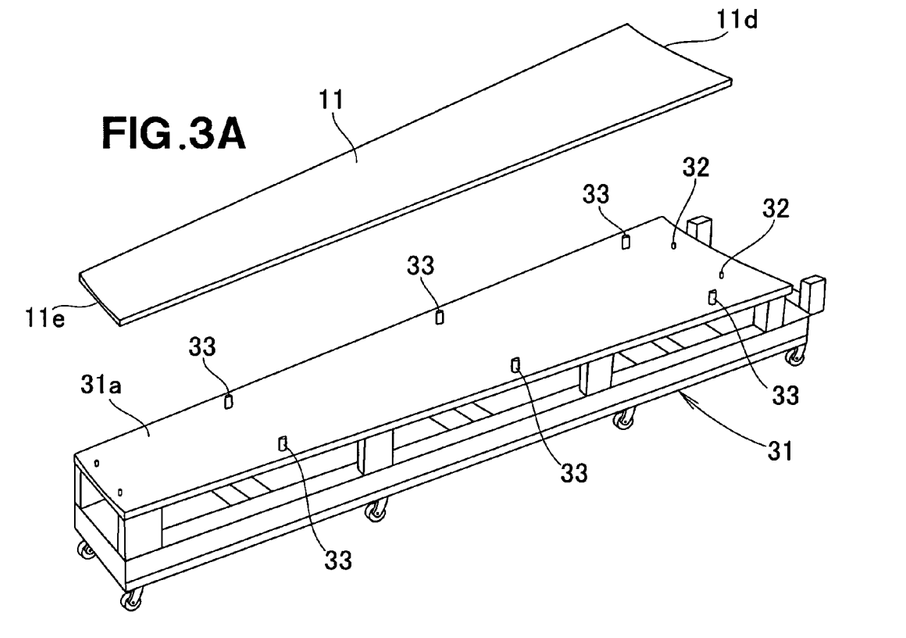
FIGS. 3A and 3B are schematic views showing the positioning of the upper skin.
Figure 3B:
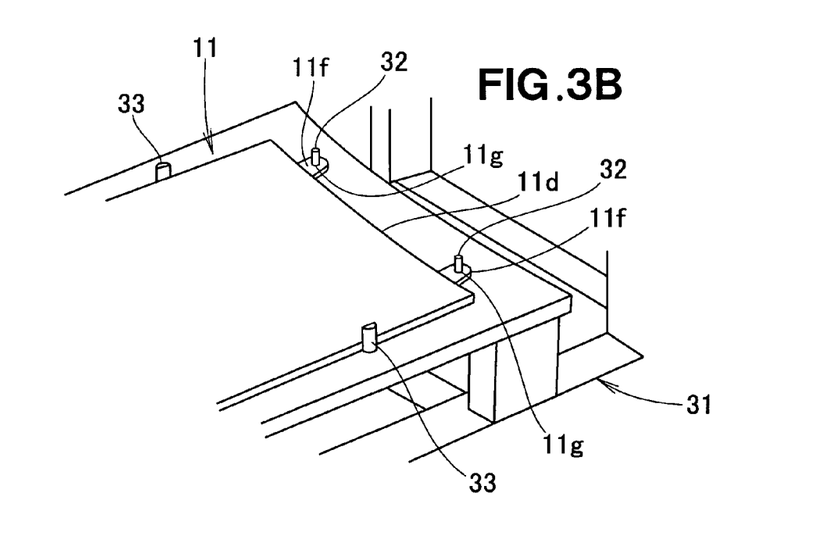

FIGS. 3A and 3B show the positioning of the upper skin 11.

In FIG. 3A, the upper skin 11 is placed on the forming surface 31a of the bonding cart 31 with the lower surface facing upward, and the upper skin 11 is positioned using a plurality of positioning pins 32 and a plurality of positioning projections 33 constituting a first reference part disposed on the forming surface 31a. Furthermore, 11d indicates the wing root end part of the upper skin 11, and 11e indicates the wing tip end part of the upper skin 11.

FIG. 3B shows a state in which the wing root end part 11d of the upper skin 11 has been positioned.

The wing root end part 11d has positioned parts 11f, 11f. Respective positioning holes 11g are formed in these positioned parts 11f, 11f. Positioning pins 32, 32 are fit into these positioning holes 11g, 11g, and the front and rear ends of the upper skin 11 are positioned by the positioning projections 33, 33.

Figure 4A:
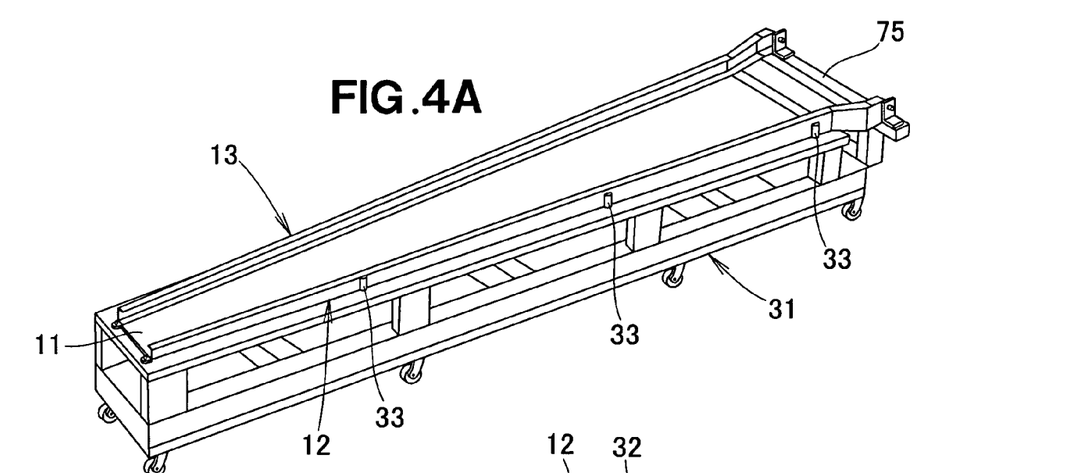
FIGS. 4A through 4C are schematic views showing the positioning of the front spar and rear spar.
Figure 4B:
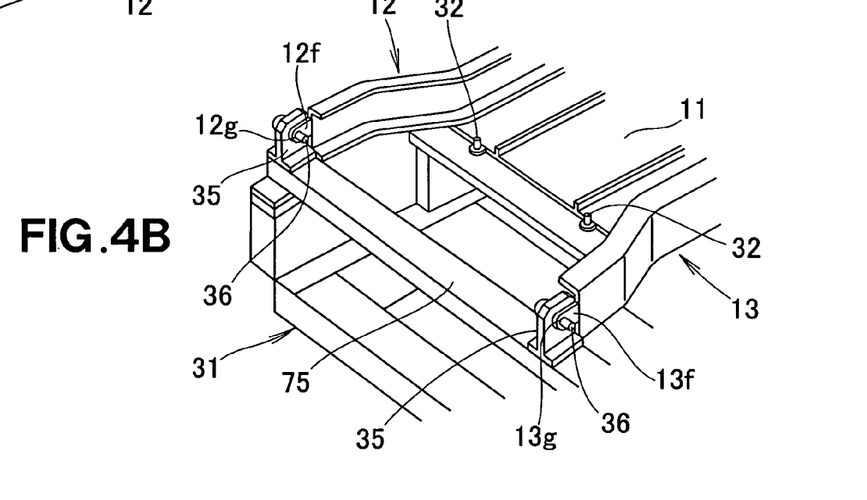
Figure 4C:
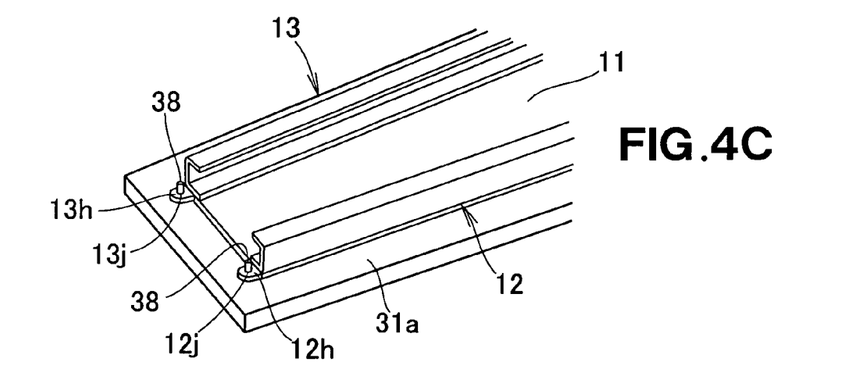

FIGS. 4A, 4B and 4C show a state in which the front spar 12 and rear spar 13 have been positioned.

In FIG. 4A, an epoxy adhesive film is pasted as an adhesive agent onto the bonding surfaces of the front spar 12 and rear spar 13; as is shown in FIG. 4A, this assembly is placed on the forming surface of the bonding cart while the front spar 12 and rear spar 13 are positioned on the front end and rear end of the upper skin 11 shown in FIG. 3B by the plurality of positioning pins and the plurality of positioning projections 33.

A thermosetting adhesive agent such as an epoxy agent, phenol agent, resorcinol agent or the like is desirable as an adhesive agent, since such agents show little creep (i.e., minute slipping between the bonding sites) under a heavy load, and are resistant to heat, water, oil (including gasoline) and the like.

Besides an adhesive agent that is pasted on, such as the film-form adhesive agent described above, it would also be possible to use an adhesive agent that is applied as a coating, such as a paste-form adhesive agent.

FIG. 4B shows a state in which the wing root end parts of the front spar 12 and rear spar 13 have been positioned.

Specifically, positioning parts 12f, 13f are formed on one end of each of the two parts, i.e., front spar 12 and rear spar 13, positioning holes 12g, 13g are respectively formed in these positioning parts 12f, 13f, and positioning pins 36, 36 respectively disposed on upright plates 35, 35 on the bonding cart 31 are fit into these positioning holes 12g, 13g.

FIG. 4C shows a state in which the wing tip end parts of the front spar 12 and rear spar 13 have been positioned.

Specifically, positioned parts 12h, 13h are formed on the other ends of the front spar 12 and rear spar 13, positioning holes 12j, 13j are respectively formed in these positioned parts 12h, 13h, and positioning pins 38, 38 disposed on the forming surface 31a of the bonding cart 31 are fit into these positioning holes 12j, 13j.

The abovementioned positioning pins 36, 38 constitute a second reference part that is used to position the abovementioned front spar 12 and rear spar 13 on the abovementioned bonding cart 31.

Figure 5A:
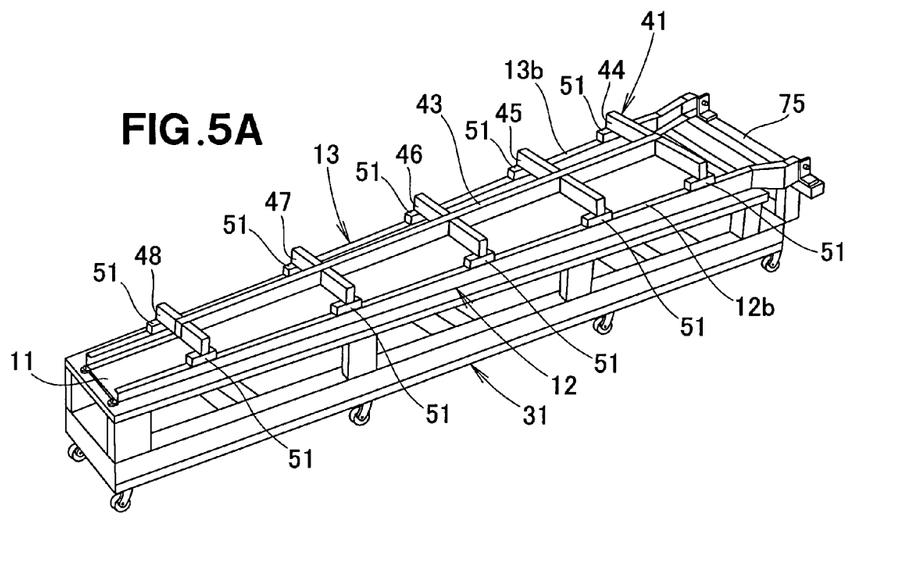
FIGS. 5A through 5C are schematic views showing a state in which the front spar and rear spar are held.
Figure 5B:
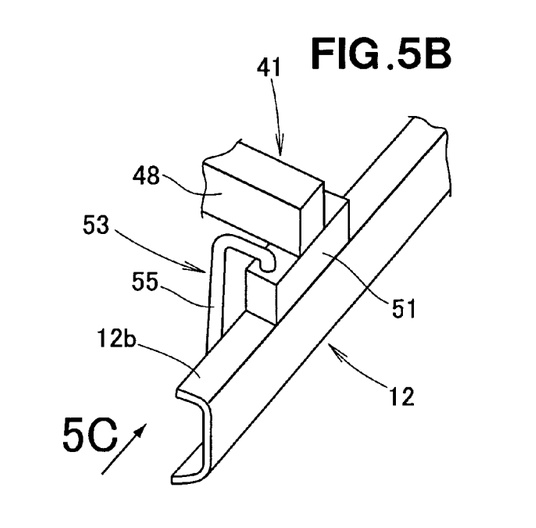
Figure 5C:
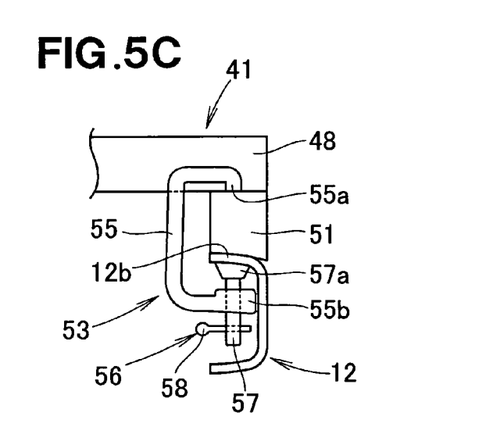

FIGS. 5A, 5B and 5C show a state in which the front spar 12 and rear spar 13 are held.

In FIG. 5A, a beam pressing jig 41 is placed on and fastened to the front spar 12 and rear spar 13. This is done in order to suppress deformation of the front spar 12 and rear spar 13 during the pressing ad heating of the bonding sites between the upper skin 11 and the front spar 12 and rear spar 13.

The beam pressing jig 41 comprises a long part 43 which extends in the wing span direction, a plurality of cross members 44, 45, 46, 47, and 48 which are attached so as to cross this long part 43, and a plurality of resin pads 51 which are attached to the lower parts of the end parts of the abovementioned cross members 44 through 48 in order to contact the flanges 12b, 13b of the front spar 12 and rear spar 13.

FIGS. 5B and 5C show a state in which the beam pressing jig 41 is fastened to the front spar 12. Specifically, the respective pads 51 of the beam pressing jig 41 are fastened to the flange 12b of the front spar 12 by fastening members 53.

As is shown in FIG. 5C, the fastening member 53 comprises a C-shaped fitting 55, one end part 55a of which is engaged with the upper surface of the pad 51, and a bolt member 56 which is screw-engaged with the other end part 55b of this C-shaped fitting, and whose upper end part is caused to contact the undersurface of the flange 12b of the front spar 12.

The bolt member 56 comprises a bolt main body 57, a handle 58 which is attached to the lower part of this bolt main body 57, and a contact member 57a which is attached to the upper end of the bolt main body 57. When the handle 58 is turned, the bolt main body 57 is caused to move upward with respect to the other end part 55b of the C-shaped member 55. Accordingly, the pad 51 and flange 12b are fastened by the first end part 55a of the C-shaped member 55 and the contact member 57a of the bolt member 56, and the beam pressing jig 41 is fastened to the front spar 12. On the side of the rear spar 13 as well, the beam pressing jig 41 is fastened by the fastening member 53 in the same manner as described above.

FIGS. 6A through 6D show the front spar 12 and rear spar 13 in a simplified representation.

Figure 6A:
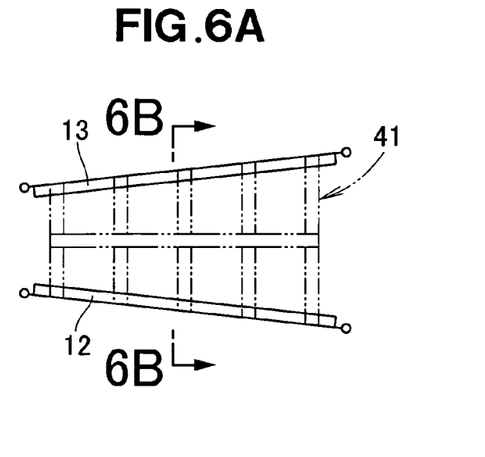
FIGS. 6A through 6D are schematic views showing the front spar and rear spar in a simplified representation.

In FIG. 6A, the adhesive agent is cured in a process of pressing and heating the bonding sites described later in a state in which the beam pressing jig 41 indicated by an imaginary line is fastened to the front spar 12 and rear spar 13. Subsequently, almost no deformation occurs in the front spar 12 or rear spar 13 even in a state in which the beam pressing jig 41 is removed.

Figure 6B:
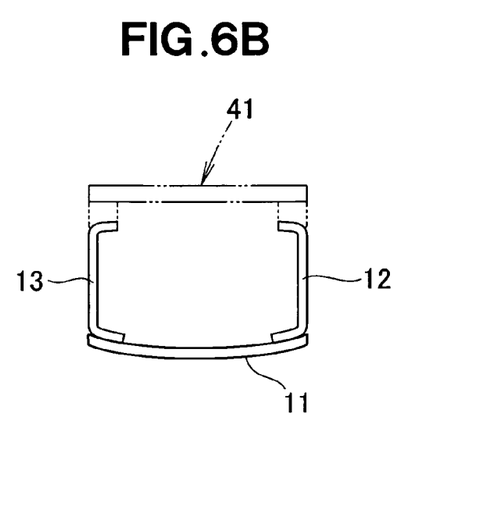

As is shown in FIG. 6B, almost no falling over (deformation) occurs in the front spar 12 or rear spar 13 even in a state in which the beam pressing jig 41 indicated by an imaginary line is removed from the front spar 12 and rear spar 13.

Figure 6C:
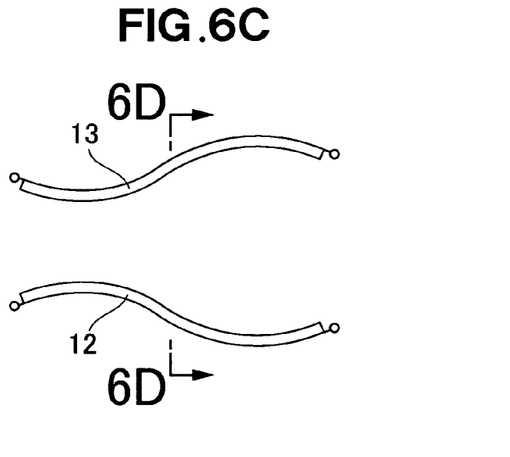

FIG. 6C shows a state following the curing of the adhesive agent in a pressing and heating process performed in a state in which the beam pressing jig 41 (FIG. 6A) is not fastened to the front spar 12 or rear spar 13. An undulation (deformation) is generated in the front spar 12 and rear spar 13.

Figure 6D:
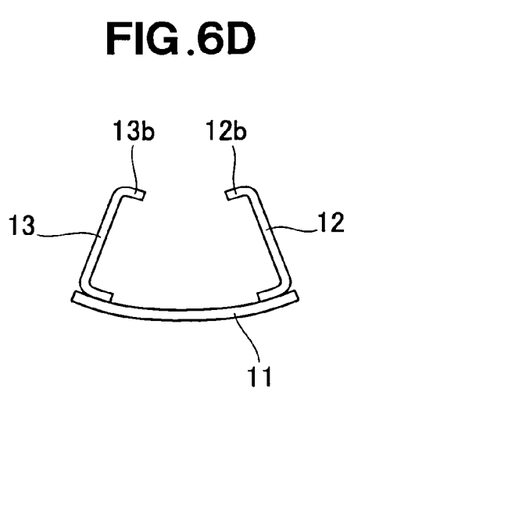

As is shown in FIG. 6D, in the front spar 12 and rear spar 13, the sides of the respective flanges 12b and 13b have fallen over toward the inside.

Figure 7:
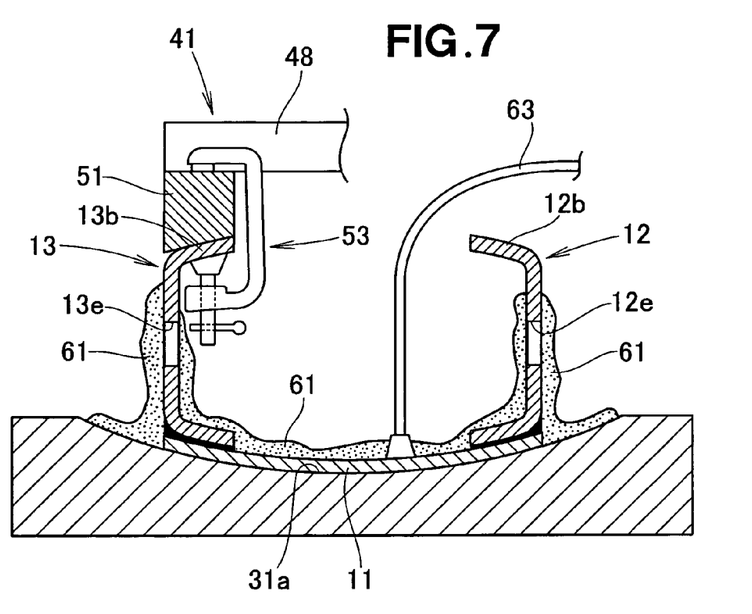
FIG. 7 is a sectional view showing a state in which the areas around the bonding sites of the upper skin and the front spar and rear spar are covered by a backing film.

FIG. 7 shows a sectional view of a state in which the areas around the bonding sites between the upper skin 11 and front spar 12 and rear spar 13 are covered by a backing film.

The areas around the bonding sites between the upper skin 11 and the front spar 12 and rear spar 13 are covered in the order described by a release film (not shown) which is a film that controls the amount of resin outflow, a bleeder cloth (not shown) which is a glass cloth that takes up the excess adhesive agent, and a breather cloth (not shown) which is a ventilating material used during vacuum pressure reduction. This is then sealed by being covered with a backing film 61.

In regard to 63, the air inside the backing film 61 is taken up by a pressure reduction pipe 63. In other words, air on the inside is removed and the pressure is reduced by the pressure reduction pipe 63, so that pressure can be applied to the bonding sites between the upper skin 11 and the front spar 12 and rear spar 13.

Figure 8:
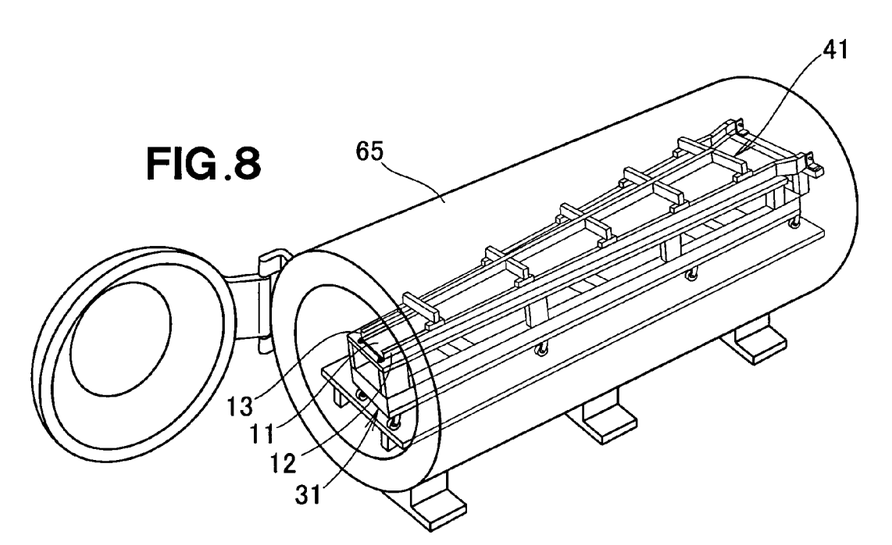
FIG. 8 is a perspective view showing a state in which the upper skin, front spar and rear spar are placed in a autoclave and pressurized/heated for each bonding cart.

As is shown in FIG. 8, the beam pressing jig 41 and the upper skin 11, front spar 12 and rear spar 13 in which the bonding sites are covered by the backing film 61 (FIG. 7) are placed inside an autoclave 65 together with the bonding cart 31, and are pressed and heated; a pressure reduction is also performed inside the backing film 61 shown in FIG. 7, and the adhesive agent is cured.

The heating temperature in this case (temperature of the bonding sites) is 120 to 180° C., the pressure is 2.8 to 3.2 kg/cm$^2$, the curing time is 1 hour, the temperature elevation rate inside the autoclave 65 is 0.2 to 6.0° C./minute, and the pressure inside the backing film is −1.0 kg/cm$^2$. A stable adhesive strength can be obtained by using these curing conditions.

If the heating temperature is less than 120° C., the adhesive agent is unreacted, and curing tends not to proceed. If the heating temperature exceeds 180° C., the adhesive agent deteriorates.

If the pressure is less than 2.8 kg/cm$^2$, gaps tend to be generated between the upper skin 11 and the front spar 12 and rear spar 13. If the pressure exceeds 3.2 kg/cm$^2$, the adhesive agent flows out from between the upper skin 11 and the front spar 12 and rear spar 13, and the thickness of the adhesive agent cannot be ensured.

In cases where a large wing is bonded, thermal strain is generated in the temperature elevation process and temperature decrease process inside the autoclave 65, and residual stress is generated in the bonding sites, thus causing cracking to occur. Accordingly, it is desirable to perform a heat treatment over a period of 4 to 8 hours as the curing time.

Figure 9A:
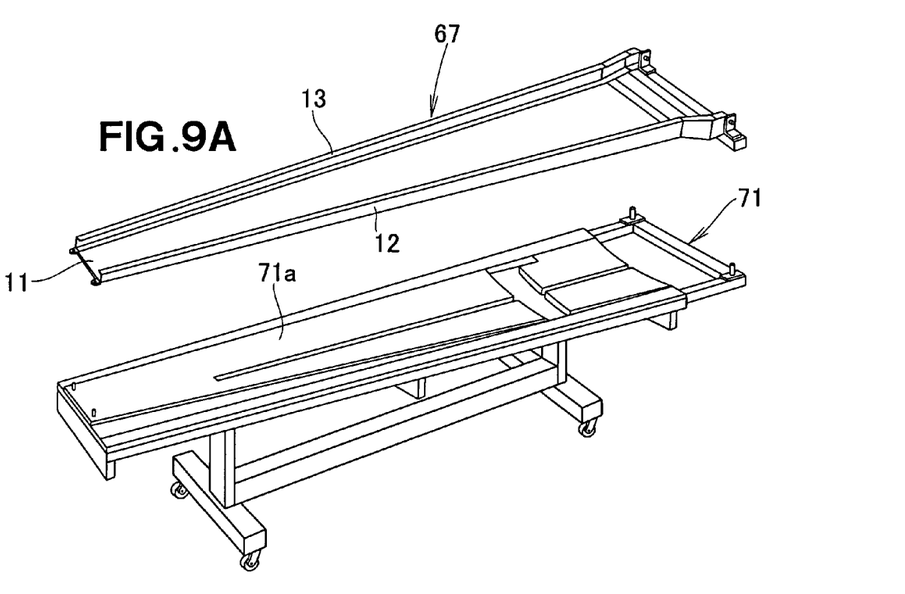
FIGS. 9A through 9C are schematic views showing a state in which the wing upper structure is positioned on the forming surface of an assembly jig.
Figure 9B:
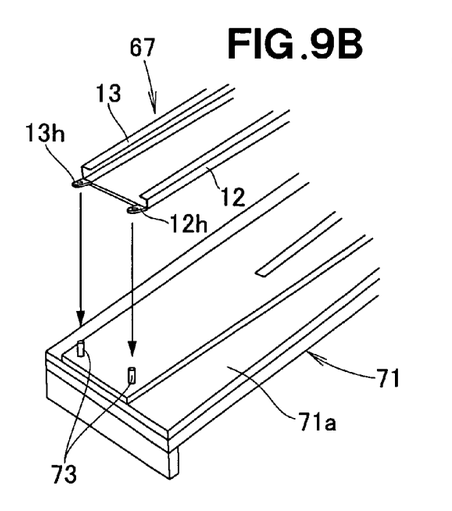
Figure 9C:
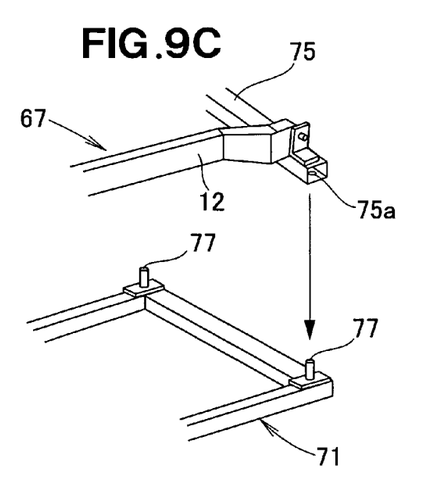

FIGS. 9A, 9B and 9C show a state in which the upper skin assembly (upper structure of the wing) 67 is positioned on the forming surface 71a of the assembly jig 71.

In FIG. 9A, the upper skin 11, front spar 12, and rear spar 13 in which the curing of the bonding sites has been completed, and the beam pressing jig 41 (FIG. 8), are removed from the autoclave 65 together with the bonding cart 31, and the beam pressing jig 41 is removed from the upper skin assembly 67 comprising the upper skin 11, front spar 12, and rear spar 13. Furthermore, the backing film 61 (FIG. 7), release film, bleeder cloth, and breather cloth are stripped away, and the upper skin assembly 67 is placed and positioned on the forming surface 71a of the assembly jig 71.

FIG. 9B shows the positioning of the wing tip side of the upper skin assembly 67 with respect to the assembly jig 71. Specifically, positioned parts 12h and 13h formed on the wing tip sides of the front spar 12 and rear spar 13 are engaged with positioning pins 73, 73 disposed on the forming surface 71a of the assembly jig 71.

FIG. 9C shows the positioning of the wing root side of the upper structure 67 of the wing with respect to the assembly jig 71. Specifically, a positioning pipe frame 75 disposed on the bonding cart 31 (FIG. 5) is left on the wing root ends of the front spar 12 and rear spar 13 (FIG. 9B), and positioning holes 75a, 75a (only one symbol 75a is shown) formed in the undersurface of this positioning pipe frame 75 are engaged with positioning pins 77, 77 disposed on the assembly jig 71.

The abovementioned positioning pins 73 and 77 constitute a third reference part that is used to position the upper skin assembly 67 on the assembly jig 71.

Figure 10A:
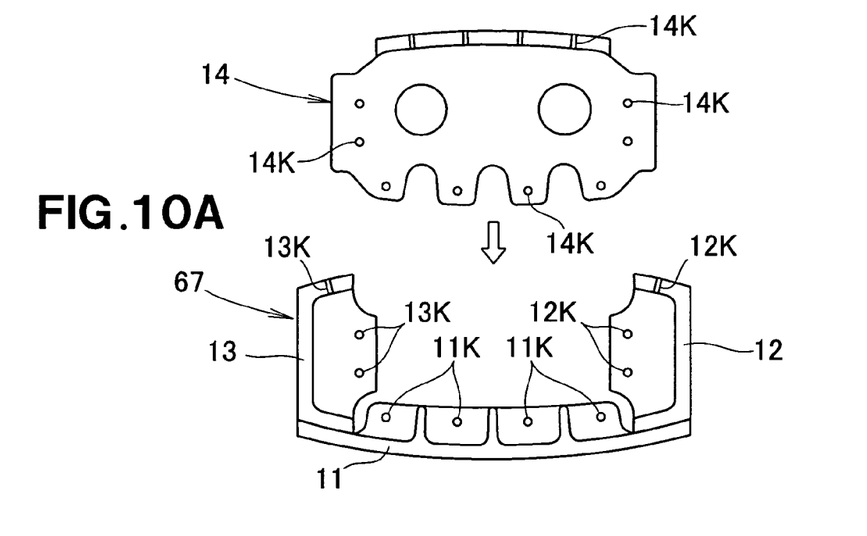
FIGS. 10A through 10C are schematic views showing a state in which a rib is mounted inside a wing upper structure.
Figure 10B:
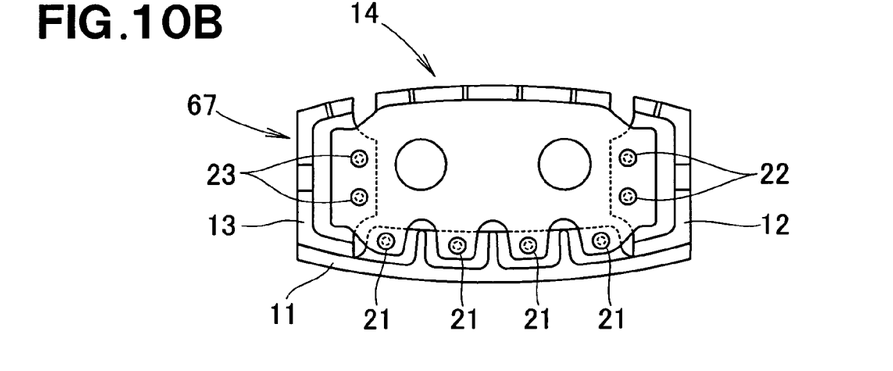
Figure 10C:
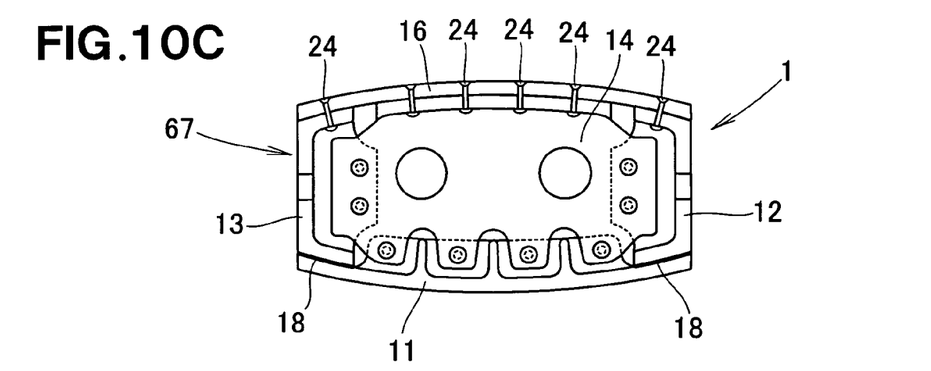

FIGS. 10A through 10C show a state in which the ribs 14 are mounted inside the upper skin assembly 67.

As is shown in FIG. 10A, the ribs 14 (14k indicates rivet holes formed beforehand) are inserted into the upper skin assembly 67 (11k, 12k, and 13k indicate rivet holes formed beforehand).

In FIG. 10B, the ribs 14 are fastened to the upper skin assembly 67 by a plurality of rivets 21, 22, 23.

As is shown in FIG. 10C, the lower skin 16 is finally fastened to the front spar 12, rear spar 13, and ribs 14 by a plurality of rivets 24. With this, the assembly of the main wing structure 1 is completed.

Figure 11:
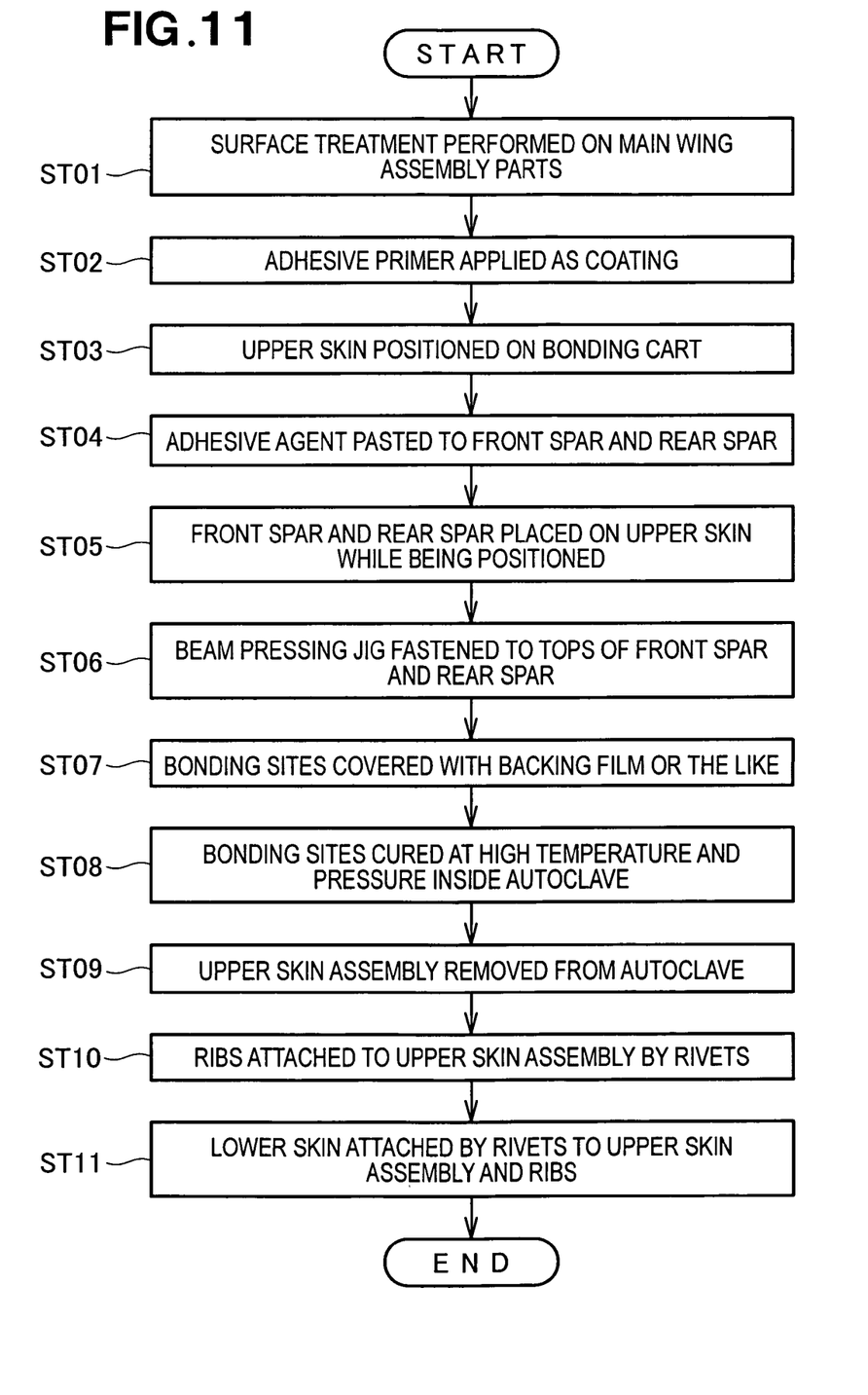
FIG. 11 is a flow chart showing the assembly procedure for the main wing structure.

Next, the method for assembly the main wing structure 1 described above will be described with reference to the flow chart shown in FIG. 11.

Step (hereafter abbreviated to "ST") 01: an anodizing treatment is performed as a surface treatment on the main wing assembly parts (upper skin, front spar, and rear spar).

ST02: an adhesive primer is applied as a coating to the upper skin, front spar and rear spar.

ST03: the upper skin is positioned on the bonding cart.

ST04: a film-form adhesive agent is pasted to the front spar and rear spar.

ST05: the front spar and rear spar are placed on the upper skin while being positioned.

ST06: the beam pressing jig is fastened to the front spar and rear spar.

ST07: the bonding sites are covered by a backing film or the like, and the bonding sites are sealed.

ST08: the bonding sites are cured at a high temperature and high pressure inside an autoclave.

ST09: the upper skin assembly removed from the autoclave is positioned on the assembly jig.

ST10: a plurality of ribs is attached by rivets to the upper skin assembly.

ST11: the lower skin is attached by rivets to the upper skin assembly and the plurality of ribs.

As is shown in FIGS. 2 through 10, the present invention first of all comprises a first step of positioning the upper skin 11 on the bonding cart 31 on the basis of position pins 32, 32 and a plurality of positioning projections 33 used as reference parts which are disposed on the forming surface 31a of the bonding cart 31 used as a bonding jig, a second step of positioning and fastening the front spar 12 and rear spar 13 as a plurality of intermediate beams on the upper skin 11 via an adhesive agent on the basis of positioning pins 36, 36, 38, 38, a third step of covering at least the bonding sites 18, 18 between the upper skin 11 and front spar 12 and rear spar 13 with a backing film 61, and a fourth step of bonding the upper skin 11 and front spar 12 and rear spar 13 by pressing and heating the bonding sites 18, 18 inside an autoclave 65, drawing the air out of the backing film 61, and curing the adhesive agent.

As a result, rivet fastening becomes unnecessary, so that the number of assembly processes such as rivet hole formation, rivet driving, and the like can be reduced. Furthermore, there is no concentration of stress, and the smoothness of the wing surfaces is improved, so that the drag of the aircraft can be reduced, and the aerodynamic performance can be improved.

Moreover, welding defects such as solidification cracks, blow holes, and the like encountered in conventional welding do no occur, the mechanical strength can be improved, and a highly reliable aluminum alloy main wing can be manufactured.

The present invention further includes a fifth step of separating the upper skin assembly 67 comprising the bonded upper skin 11, front spar 12, and rear spar 13 from the bonding cart 31 following the curing of the adhesive agent, a sixth step of positioning the upper skin assembly 67 on the assembly jig 71 on the basis of positioning pins 73, 73, 77, 77 disposed on the assembly jig 71, a seventh step of disposing a plurality of ribs 14 in specified positions on this upper skin assembly 67, and then fastening the upper skin assembly 67 and plurality of ribs 14 using rivets, and an eighth step of disposing the lower skin 16 in a specified position with respect to the upper skin assembly 67 to which the plurality of ribs 14 has been fastened by rivets, and then fastening the upper skin assembly 67 and ribs 14 to the lower skin 16 using rivets.

As a result, since the lower skin 16 is fastened using rivets to the upper skin assembly 67, the upper skin assembly 67 and lower skin 16 can be strongly fastened, and the rigidity of the main wing can be improved.

In the present invention, when the abovementioned front spar 12 and rear spar 13 are positioned on and fastened to the abovementioned upper skin 11, a beam pressing jig 41 is fastened to the upper parts of the front spar 12 and rear spar 13, and the front spar 12 and rear spar 13 are held.

As a result, deformation of the front spar 12 and rear spar 13 during the curing of the adhesive agent is prevented.

In the present embodiment, two spars, i.e., the front spar 12 and rear spar 13 are disposed between the upper skin 11 and lower skin 16, as shown in FIG. 1. However, the present invention is not limited to this. Another spar may be disposed between the front spar 12 and rear spar 13, this spar may be adhesively bonded to the upper skin 11, and this spar may be fastened to the lower skin 16 using rivets.

Obviously, various minor changes and modifications of the present invention are possible in light of the above teaching. It is therefore to be understood that within the scope of the appended claims the invention may be practiced otherwise than as specifically described.

What is claimed is:

1. A method for assembling a main wing made of an aluminum alloy, comprising the steps of:

positioning an upper skin of a wing skin on a bonding cart on the basis of a first reference part disposed on a forming surface of the bonding cart;

positioning and fastening a plurality of spars via an adhesive agent on the upper skin on the basis of a second reference part disposed on the bonding cart;

covering only bonding sites of the upper skin and each of the spars with a backing film;

adhesively joining the upper skin and the spars as an upper skin assembly by pressurizing and heating the bonding sites inside an autoclave, removing the air from the inside of the backing film, and curing the adhesive agent;

disposing a lower skin of the wing skin on the upper skin assembly; and rivet-fastening the spars of the upper skin assembly and the lower skin of the wing skin.

2. The assembly method of claim 1, further comprising holding the spars by fastening a beam pressing jig to upper parts of the spars when the spars are positioned on and fastened to the upper skin.

3. A method for assembling a main wing made of an aluminum alloy, comprising the steps of:

positioning an upper skin of a wing skin on a bonding cart on the basis of a first reference part disposed on a forming surface of the bonding cart;

positioning and fastening a plurality of spars via an adhesive agent on the upper skin on the basis of a second reference part disposed on the bonding cart;

covering at least bonding sites of the upper skin and each of the spars with a backing film;

adhesively joining the upper skin and the spars by pressurizing and heating the bonding sites inside an autoclave, removing the air from the inside of the backing film, and curing the adhesive agent;

separating an upper skin assembly, which is composed of the bonded upper skin and the spars, from the bonding cart after the adhesive agent has cured;

positioning the upper skin assembly on an assembly jig on the basis of a third reference part disposed on the assembly jig;

rivet-fastening the upper skin assembly and a plurality of ribs after the ribs are disposed in predetermined positions on the upper skin assembly; and rivet-fastening the upper skin assembly and lower skin after the lower skin of the wing skin has been disposed in a predetermined position with respect to the upper skin assembly to which the ribs are riveted.

4. The assembly method of claim 1, wherein the bonding sites of the upper skin and the spars are located at a first side of the spars, and the step of rivet-fastening the spars of the upper skin assembly and the lower skin of the wing skin includes rivet-fastening the spars and the lower skin on a second side of the spars opposite to the first side of the spars.

* * * * *